UNITED STATES PATENT OFFICE.

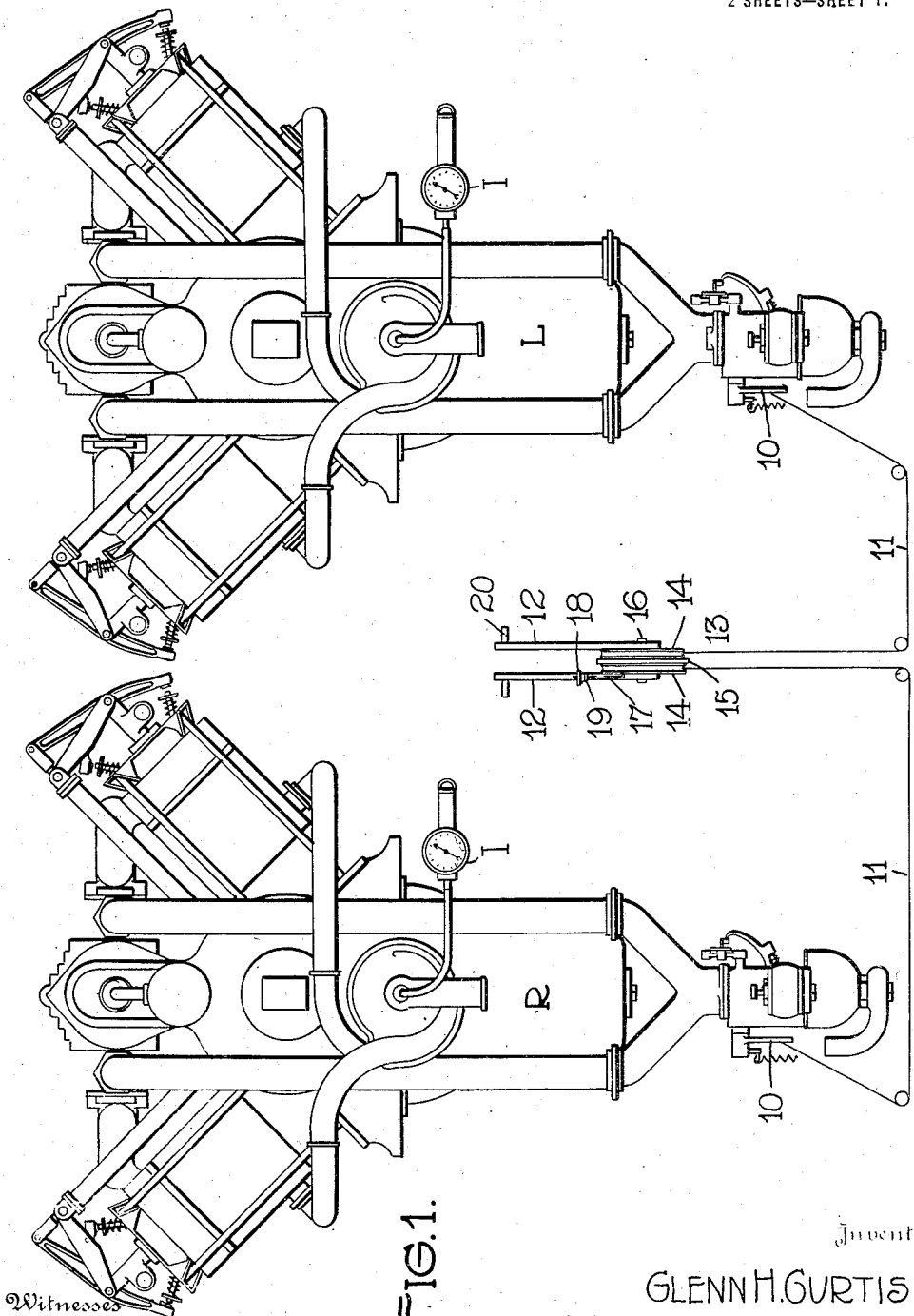

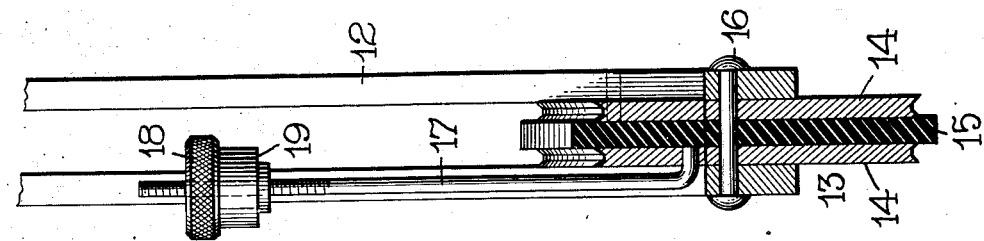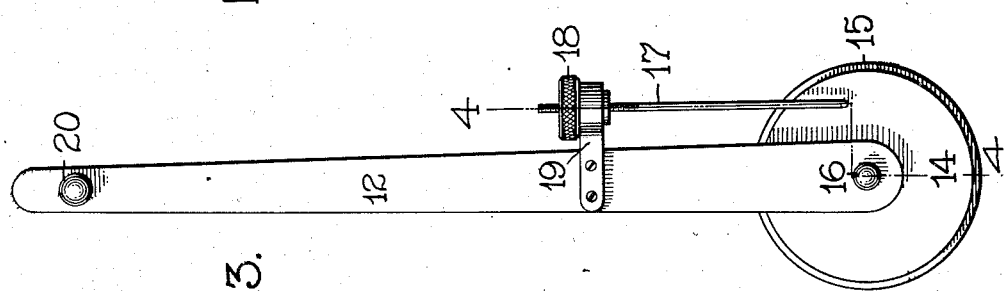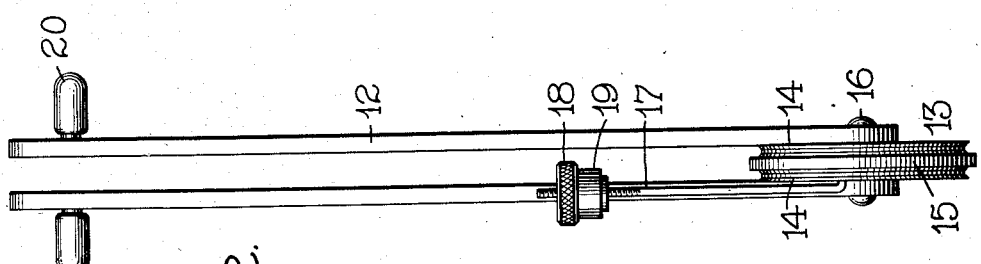

GLENN H. CURTISS, OF HAMMONDSPORT, NEW YORK, ASSIGNOR TO THE CURTISS MOTOR COMPANY, OF HAMMONDSPORT, NEW YORK, A CORPORATION OF NEW YORK.

MULTIPLE-CONTROL SYSTEM FOR PRIME MOVERS.

1,223,316.  Specification of Letters Patent.  Patented Apr. 17, 1917.

Application filed December 11, 1914. Serial No. 876,717.

*To all whom it may concern:*

Be it known that I, GLENN H. CURTISS, a citizen of the United States, residing at Hammondsport, in the county of Steuben and State of New York, have invented certain new and useful Improvements in Multiple-Control Systems for Prime Movers, of which the following is a specification.

My invention relates to multiple control systems particularly adapted for the control of motors used for aeronautical purposes, and has for its object the production of a control system through which joint control may be exercised with maximum simplicity and which will at the same time permit ready independent adjustment of any prime mover for the purpose of load distribution, steering, balance or the like. However, while of this particular adaptation, I wish it understood at the outset that my invention may be used in connection with motors or prime movers of other types.

According to my invention I provide a speed or power regulating device for each prime mover, a control lever for each regulating device by means of which it may be individually and independently operated, connections between each control lever and the associated regulating device, a multiple position clutch device between the control levers whereby any lever may be independently adjusted with respect to the others and thereafter clutched to its associates, and connecting adjusting means intermediate at least one lever and its associated regulating device whereby the control levers may be adjusted in their positional relations to each other independently of the adjustment of the regulating devices. Preferably I locate the control levers adjacently so that they may be conveniently operated individually or conjunctively by one and the same hand.

In the accompanying drawings I show one embodiment of my invention, to wit, that embodiment which is now best known to me, but I wish to state that my invention like most others is capable of other embodiments by others skilled in the art without in any wise departing from its scope.

Referring to the drawings, Figure 1 is a diagrammatic illustration of the system as applied to a pair of internal combustion motors of the aeronautical type;

Fig. 2 is a front elevation of the associated pair of control levers;

Fig. 3 is a side elevation thereof; and,

Fig. 4 is a front elevation of the same levers with parts broken away and in section on line 4—4 of Fig. 3.

The two prime movers are designated R, L, respectively, indicating that the one may be right and the other left as respects the longitudinal axis of the craft to which they supply power. Each of these motors is provided with a speed or power regulating device 10. Each regulating device is connected in this case by cable 11 with a control lever 12 located at a central point. In practice this location would be near the operator's seat. Preferably though not necessarily, the levers 12 are located adjacent each other and are adapted to move through the same angular range of control. Intermediate the levers is provided a multiple position clutch 13 in the form of a pair of metallic disk pulleys 14 and an intermediate fiber disk 15 mounted on the same axis, as is provided by a pintle or rivet 16, which is passed through the several disks 14—14—15, is headed over and presses the parts into frictional engagement, the whole arrangement serving as a base for the mounting of the corresponding levers 12. One of the levers 12 is fixedly connected to the associated pulley 14, while the other is adjustably connected to its associated pulley 14 and from it to the cable 11 and the associated regulating device. This adjustable connection comprises a link 17 one end of which is socketed in pulley 14 at a point radially removed from the axis thereof, and the other end of which is threaded into a nut 18 held rotatably in the outer end of the lug or arm 19 secured to lever 12. Each lever is provided at its upper end with a small operating handle 20.

In using the system of my invention, according to the method of my invention, I first regulate the speed of one motor to an arbitrarily chosen value, preferably near normal load speed or somewhat below it, moving the control lever 12 of that motor independently and irrespective of the control lever 12 of the other motor, reading such speed from a suitable tachometer or other speed indicator I. Then, retaining the control lever 12 of the one motor in its adjusted position, thereby holding the speed constant, I adjust the speed of the other motor to correspond by moving its associated control lever 12 irrespective of its relation to the lever 12 already set. The friction of clutch 13 is such that it may be readily overcome by a moderate force. When the speeds so adjusted read the same on the tachometers I, the relative movement of the levers 12 is stopped. Then, by turning the nut 18, the connection of the associated lever 12 with its associated regulating device 10 (through cable 11 and pulley 14) is adjusted by alteration of the length of link 17 until the lever 12 provided with this adjustment 17—18—19 occupies a position substantially in parallelism with that of the other lever 12. This is done without altering or affecting in any way the previously adjusted speed of the motors, the relative adjustment of the regulating devices 10 being maintained by reason of the mounting base 13 between them. This last adjustment of the connection by link 17 having been made, and the levers being in parallelism, they may thenceforward be moved synchronously by one and the same hand, which hand may either grasp both levers at the same time or one lever alone, since in the latter case the friction of the clutch connection 13 is sufficient to maintain the levers and hence the regulating devices in their relative positions against the normal force required for their operation, whether that force be applied to one lever or the other.

What I claim is:

1. A multiple control system for motors comprising a speed regulating element for each motor, with control levers connected therewith and lying adjacent to each other upon a common base, and connection adjusting means between one of said control levers and the associated regulating device whereby the position of said control lever with respect to the regulating device may be changed.

2. A multiple control system for motors comprising a speed regulating device for each motor, control levers connected therewith, lying adjacent to each other upon a common base, and adapted to move through substantially the same angular range, together with connection adjusting means intermediate one of said control levers and the associated regulating device whereby said one lever may be adjusted into parallelism with the other lever without altering the regulated conditions of the motors.

3. A multiple control system for motors comprising a speed regulating device for each motor, control levers connected therewith and lying so closely adjacent upon a common base that they may be conjunctively operated by one hand, and connection adjusting means between one of said levers and the associated regulating devices whereby the one lever may be adjusted to parallelism with the other.

4. A multiple control system for motors comprising a speed regulating device for each motor, control levers connected therewith, a clutch connection between the levers whereby they are clutched together in various angular relations, and a connection adjusting means intermediate one lever and the associated regulating device.

5. A multiple control system for motors comprising a speed regulating device for each motor, control levers therefor, a friction clutch connection between said levers arranged to permit independent adjustment thereof by force sufficient to overcome the friction of the clutch but requiring a force in excess of that necessary to operate all of the regulators, together with a connection adjusting means between one of the levers and the associated regulating device whereby the levers may be adjusted to parallelism independently of said friction connection.

6. A multiple control system for motors comprising a speed regulating device for each motor, control levers therefor, and a multiple position clutch connection between said levers whereby they are clutched together for simultaneous or independent movement.

7. A multiple control system for motors, a plurality of regulating devices one for each motor, a corresponding plurality of operating members for the control devices, multiple position clutching means interconnecting said operating members for simultaneous operation, and a connection adjusting device intermediate at least one operating member and associated regulating device.

8. A multiple control system for motors comprising a plurality of regulating devices, one for each motor, a corresponding plurality of operating members for the control devices, and a connection adjusting device intermediate at least one operating member and its associated regulating device.

9. A multiple control system for a plurality of motors comprising a speed regulating device for each motor mounted, each device to rotate approximately about the extending axis of the other, and having adjacent body portions whereby they may be simultaneously grasped and adjusted.

10. A multiple control system for a plurality of motors comprising a speed regulating device for each motor mounted, each device to rotate approximately about the extended axis of the other, and having adjacent and substantially parallel ranges of adjustment whereby they may be grasped together in one hand and adjusted simultaneously.

11. A multiple control system for a plurality of motors comprising a speed regulating device for each motor mounted, each device to rotate approximately about the extending axis of the other, and having adjacent and substantially parallel ranges of adjustment whereby they may be grasped and adjusted simultaneously, and a connection adjusting device intermediate at least one operating member and its associated regulating device.

In testimony whereof I affix my signature in presence of two witnesses.

GLENN H. CURTISS.

Witnesses:
 G. R. HALL,
 H. C. GENUNG.